Patented Nov. 21, 1939

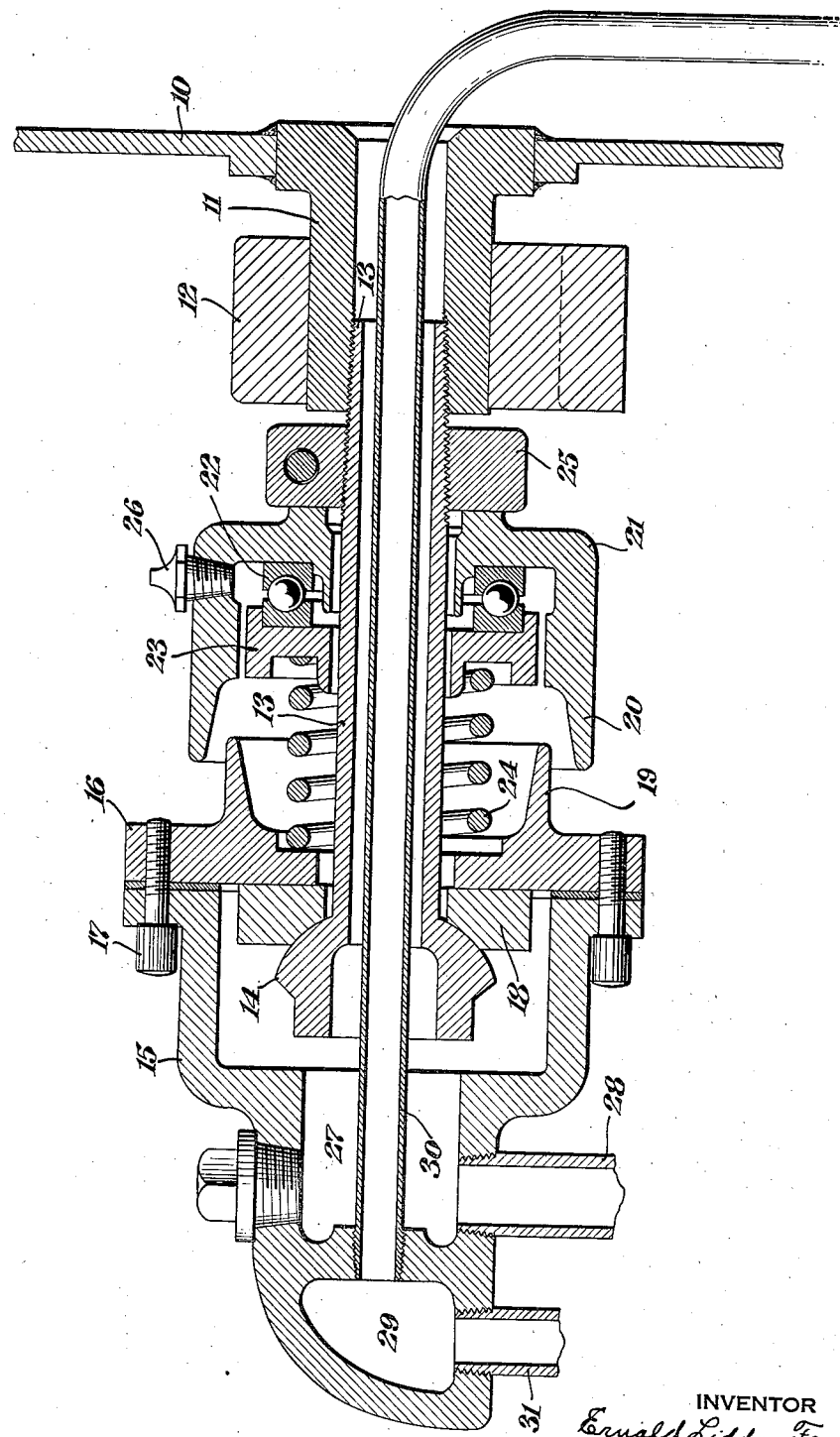

2,180,407

UNITED STATES PATENT OFFICE 2,180,407

STEAM JOINT

Ernald Liddon Few, Wimbledon, England

Application December 7, 1938, Serial No. 244,315

3 Claims. (Cl. 285—10)

This invention relates to steam joints and more especially to steam joints used in connection with rotating apparatus such, for example, as a drying roll.

An object of this invention is a simple and effective steam joint in which the rotating and stationary parts are spring-pressed into sealing engagement, but have great freedom of movement and friction between the stationary and rotating parts is reduced to a minimum.

In one embodiment of the invention, the steam joint comprises a casing having an aperture through which extends a pipe. A radially movable ring engages said casing in register with the aperture and is provided with a concave bearing surface constituting a segment of a sphere with which engages a convex bearing surface provided on said pipe, said convex surface also constituting a segment of a sphere. A cap or sleeve is supported by said pipe and carries an anti-friction member between which and the casing is interposed a helical spring which serves to maintain the two bearing surfaces in fluid-tight relation. Relative movement of the pipe and casing is permitted due to the spherical contour of the bearing surfaces and the anti-friction member serves to reduce friction upon relative rotation of said casing and pipe.

Other objects, novel features and advantages of this invention will become apparent from the following specification and accompanying drawing, wherein:

The figure is a longitudinal section through a joint embodying the invention.

A steam drum 10 of which merely a fragmentary view of one end is illustrated in the drawing is equipped with a hub 11 journalled in a bearing 12. Threaded into the end of the hub 11 is a pipe 13 having a head 14 provided with a convex bearing surface constituting a segment of a sphere. The head 14 is enclosed in a casing consisting of a generally cylindrical or cup-shaped body portion 15 and a cover 16 therefor, the cover being attached to the body portion by means of bolts 17. The cover 16 has an aperture of somewhat larger diameter than the pipe 13 and through which the pipe passes. A ring 18 is arranged within the casing in register with the cover aperture and in slidable contact with the flat inner surface of the cover for radial movement relative to said casing. The ring 18 is preferably a graphitic carbon disk which is self-lubricating and is provided with a concave bearing surface constituting a segment of a sphere. The convex bearing surface of the head 14 engages the concave surface of the disk 18 and the pipe 13 passes through the aperture of said disk.

The cover 16 is provided with an annular flange 19 which is received within a flange 20 projecting from a sleeve 21 supported by the pipe or shaft 13. The sleeve 21 contains an anti-friction thrust bearing 22 which is engaged by a disk 23 between which and the cover 16 is interposed a helical spring 24, the spring being enclosed by the flanges 19 and 20. A nut 25 holds the sleeve 21 in proper position of adjustment on the pipe 13 to give the desired compression to the spring 24.

The spring 24 resiliently holds the convex and concave bearing surfaces of the head 14 and ring 18 in engagement and friction resulting from relative rotation of the casing and shaft 13 is reduced to a minimum by the provision of the annular friction bearing 22. A grease fitting 26 in the sleeve 21 permits lubrication of the anti-friction bearing and lubrication between the convex and concave bearing surfaces results from the composition of the ring 18.

The spring 24 maintains a steam tight joint at all times between the head 14 and the ring 18 by virtue of the co-operating convex and concave bearing surfaces and by reason of the permissible radial movement of the ring 18 and pipe 13 relative to the casing enclosing said head 14 and ring 18. Due to this arrangement, a tight seal is maintained irrespective of the angular relation between the axis of the pipe 13 and the axis of the ring 18 and irrespective of misalinement of the axis of pipe 13 and the axis of the casing enclosing the head 14 and the ring 18.

In the body member 15 of the casing is provided a recess 27 communicating with the interior of the casing and a pipe 28 communicates with the recess 27. Also, in said body portion is provided a chamber 29 with which communicates a pipe 30 extending through the shaft 13 into the interior of the steam drum and with it also communicates a pipe 31. Steam for heating the drum is introduced thereinto through the pipe 28, recess 27 and shaft 13 while water is removed from the rim area of the drum through the pipe 30, chamber 29 and pipe 31.

It is of course understood that other modifications than the one shown are contemplated and that various changes may be made in the arrangement and structure of the steam joint herein disclosed without in any way departing from the spirit of the invention as defined in the appended claims.

I claim:

1. In a joint of the character described, a casing comprising a cup-shaped body and an apertured cover detachably connected thereto, a ring slidably engaging the inner surface of said cover in alinement with the aperture therein, a pipe passing through said ring and aperture, said pipe and ring having contacting bearing surfaces of which one is concave and the other convex and each constitutes a segment of a sphere, said body portion having a recess communicating with the interior of said pipe and having a chamber, a conduit leading from said chamber through said pipe, and resilient means exterior of said casing for maintaining said bearing surfaces in fluid-tight relation.

2. In a joint of the character described, a casing comprising a cup-shaped body and an apertured cover detachably connected thereto, a ring slidably engaging the inner surface of said cover in alinement with the aperture therein, a pipe passing through said ring and aperture, said pipe and ring having contacting bearing surfaces of which one is concave and the other convex and each constitutes a segment of a sphere, said body portion having a recess communicating with the interior of said pipe and having a chamber, a conduit leading from said chamber through said pipe, and means including a resilient member and anti-friction bearing exterior of said casing for maintaining said bearing surfaces in fluid-tight relation.

3. In a joint of the character described, a casing comprising a cup-shaped body and an apertured cover detachably connected thereto, a ring slidably engaging the inner surface of said cover in alinement with the aperture therein, a pipe passing through said ring and aperture, said pipe and ring having contacting bearing surfaces of which one is concave and the other convex and each constitutes a segment of a sphere, said body portion having a recess communicating with the interior of said pipe and having a chamber, a conduit leading from said chamber through said pipe, a sleeve supported by said pipe, an anti-friction bearing carried by said sleeve, and a coil spring interposed between said anti-friction bearing and said cover for maintaining said bearing surfaces in fluid-tight relation.

ERNALD LIDDON FEW.